US010995164B2

United States Patent
Delgado et al.

(10) Patent No.: US 10,995,164 B2
(45) Date of Patent: *May 4, 2021

(54) METHOD OF FORMING THERMORESPONSIVE POLYMERS

(71) Applicant: PHILLIPS 66 COMPANY, Houston, TX (US)

(72) Inventors: Paula Delgado, Bartlesville, OK (US); Amit Palkar, Bartlesville, OK (US)

(73) Assignee: Phillilps 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,662

(22) Filed: Jul. 28, 2017

(65) Prior Publication Data

US 2018/0030171 A1 Feb. 1, 2018

Related U.S. Application Data

(60) Provisional application No. 62/368,390, filed on Jul. 29, 2016.

(51) Int. Cl.
| | | |
|---|---|---|
| *C08F 220/36* | (2006.01) | |
| *C08F 220/56* | (2006.01) | |
| *C08F 120/30* | (2006.01) | |
| *C08F 120/56* | (2006.01) | |
| *C08F 120/18* | (2006.01) | |

(52) U.S. Cl.
CPC .......... *C08F 120/30* (2013.01); *C08F 120/18* (2013.01); *C08F 120/56* (2013.01); *C08F 220/36* (2013.01); *C08F 220/56* (2013.01); *C08F 2500/02* (2013.01)

(58) Field of Classification Search
CPC .... C08F 120/18; C08F 120/30; C08F 120/56; C08F 220/36; C08F 220/56
See application file for complete search history.

(56) References Cited

U.S. PATENT DOCUMENTS

| | | | | |
|---|---|---|---|---|
| 5,610,250 A | * | 3/1997 | Veregin | C08F 10/00 526/204 |
| 2007/0265395 A1 | * | 11/2007 | Chiesl | C08F 220/58 525/214 |
| 2011/0251364 A1 | * | 10/2011 | Anthamatten | A61L 31/04 526/258 |
| 2015/0376594 A1 | * | 12/2015 | Walker | C12Q 1/54 435/14 |

OTHER PUBLICATIONS

Cui et al ; "Multivalent H-bonds for self-healing hydrogels"; Chem. Commun., 2012, 48, pp. 9302-9304.*

Lewis et al; The influence of Hydrogen Bonding Slde-Groups on Viscoelastic Behavior of Linear and Network Polymers; Macromolecules; 2014, 47(2), pp. 729-740.*

* cited by examiner

*Primary Examiner* — Karuna P Reddy
(74) *Attorney, Agent, or Firm* — Phillips 66 Company

(57) ABSTRACT

A method of forming a thermoresponsive polymer. The method proceeds by mixing 2-(3-(4-methyl-6-oxo-1,6-dihydropyrimidin-2-yl)ureido)ethyl methacrylate and methacrylamide in the presence of a solvent form a monomer solution. An initiator is then added to the monomer solution to form a thermoresponsive polymer.

7 Claims, 1 Drawing Sheet

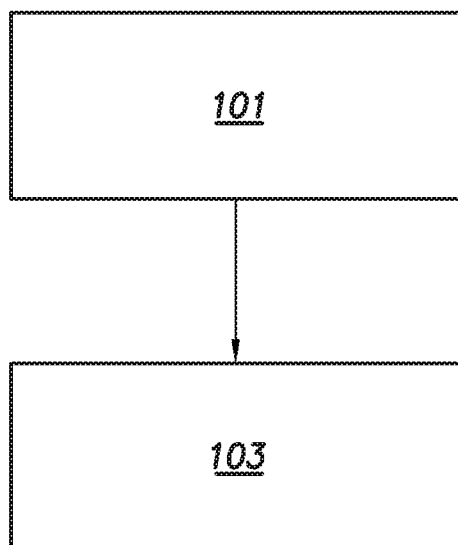

METHOD OF FORMING THERMORESPONSIVE POLYMERS

CROSS-REFERENCE TO RELATED APPLICATIONS

This application is a non-provisional application which claims the benefit of and priority to U.S. Provisional Application Ser. No. 62/368,390 filed Jul. 29, 2016, entitled "Method of Forming Thermoresponsive Polymers," which is hereby incorporated by reference in its entirety.

STATEMENT REGARDING FEDERALLY SPONSORED RESEARCH OR DEVELOPMENT

None.

FIELD OF THE INVENTION

This invention relates to a method of forming thermoresponsive polymers.

BACKGROUND OF THE INVENTION

Thermoresponsive polymers are polymers that exhibit a drastic and discontinuous change of the physical properties with temperature. Temperature is a stimulus that can be applied easily and reversibly in contrast to, for instance, chemical additives.

There exists a need for a method of forming thermoresponsive polymers.

BRIEF SUMMARY OF THE DISCLOSURE

A method of forming a thermoresponsive polymer in organic solvent. The method proceeds by mixing 2-(3-(4-methyl-6-oxo-1,6-dihydropyrimidin-2-yl)ureido)ethyl methacrylate (MAUPy) and methacrylamide (MAAm) in the presence of an organic solvent to form a monomer solution. An initiator is then added to the monomer solution to form a thermoresponsive polymer.

A method of forming a thermoresponsive polymer. The method proceeds by mixing from about 0.01 mol % to about 50 mol % 2-(3-(4-methyl-6-oxo-1,6-dihydropyrimidin-2-yl) ureido)ethyl methacrylate and from about 50 mol % to about 99.99 mol % methacrylamide in the presence of a dimethyl sulfoxide solvent, at a temperature greater than 50° C. to form a monomer solution. An azobisisobutyronitrile can then be added to the monomer solution, in a molar ratio of 1:5 to 1:10,000, to form a thermoresponsive polymer. Upon completion of reaction the thermoresponsive polymer can also be purified in a polar solvent.

BRIEF DESCRIPTION OF THE DRAWINGS

A more complete understanding of the present invention and benefits thereof may be acquired by referring to the follow description taken in conjunction with the accompanying drawings in which:

FIG. 1 depicts the method of forming a thermoresponsive polymer.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

A method of forming a thermoresponsive polymer or a water-soluble thermoresponsive polymer is shown in FIG. 1. The method proceeds by mixing 2-(3-(4-methyl-6-oxo-1,6-dihydropyrimidin-2-yl)ureido)ethyl methacrylate and methacrylamide (MAAm) in the presence of solvent form to a monomer solution, which can then be optionally degassed (101). An initiator is then added to the monomer solution to form a thermoresponsive polymer (103).

Upon completion of polymerization, the polymer exhibits thermoresponsive behavior through hydrogen bonding. When bonded together the hydrogen bonding groups can be either bonded by complementary hydrogen bonding groups, or could be self-complementary bonded.

Non-limiting examples of the organic solvent that can be used include dimethyl sulfoxide, dimethyl formamide, ethyl acetate, methanol, dioxane, tetrahydrofuran, acetone, methylene chloride, chloroform, and toluene.

In another embodiment the initiator can be an addition-type initiator, such as radical initiators. Non-limiting examples of addition-type initiators that can be used include azo initiators, azobisisobutyronitriles, peroxides, persulfates and redox systems. In one embodiment the initiator can also be a UV initiator. Non-limiting examples of peroxide initiators include: persulfate salts, hydrogen peroxide, alkyl peroxide, alkyl peroxyesters, peroxydicarbonates, hydroperoxides and combinations thereof. Non-limiting examples of azo initiators include: 4,4'-azobis(4-cyanovaleric acid), 4,4'-azobis-(4-cyanopentanoic acid), 2,2'-azobis(2-methylpropionamidine)dihydrochloride, 2,2'-azobis[2-(2-imidazolin-2-yl)propane]dihydrochloride, 2,2'-azobis[N-(2-carboxyethyl)-2-methylpropionamidine]tetrahydrate, 2,2'-azobis[2-(2-imidazolin-2-yl)propane], 2,2'-azobis[2-methyl-N-(2-hydroxyethyl)propionamide], 2,2'-azobis-(2-amidinopropane) dihydrochloride, 2,2'-azobis(N,N'-dimethylene isobutyramidine) dihydrochloride, 2,2'-azobis (N,N'-dimethylene isobutyramidine), 2,2'-azobis-(isobutyramide)dehydrate, 2,2'-azobis-(N-ethylamidinopropane hydrochloride), 2,2'-azobis-(N,N'-dimethyleneamidinopropane hydrochloride), 2,2'-azobis(2-propane-2-carboxylic acid), 2,2'-azobis-(2-methyl-N-(2-hydroxyethyl))propionamide, 2,2'-azobis-[2-methyl-N-(1,1-bis(hydroxymethyl)]propionamide, 2,2'-azobis-[2-methyl-N-(1,1-bis(hydroxymethyl)-2-hydroxyethyl)]propionamide and combinations thereof.

In one embodiment azobisisobutyronitrile can be dissolved in the same or different solvent in molar ratios of 1:5 to 1:10000 with respect to the molar concentration of the monomer solution to form the thermoresponsive polymer. Examples of ranges in molar ratios from 1:5, 1:10, 1:25, 1:50 1:75, 1:100, 1:500, 1:1000, 1:1500, 1:2000, 1:2500, 1:3000, 1:3500, 1:4000, 1:4500, 1:5000, 1:5500, 1:6000, 1:6500, 1:7000, 1:7500, 1:8000, 1:8500, 1:9000, 1:9500, 1:10000 or any range in between the numbers given. This initiator solution is then mixed with the monomer solution to initiate the polymerization.

In one embodiment the monomer solution is heated to a temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The heating of the monomer solution can occur either by directly heating the monomer solution, incorporating the monomer solution into another solution with a greater temperature than the monomer solution, or any other method known of heating the monomer solution.

In another embodiment the mixing of the monomer solution occurs at an elevated temperature. Examples of the temperature in which the monomer solution can be mixed in include temperature greater than 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or even greater than 200° C. The mixing of the monomer solution at an elevated temperature can occur by heating one component of the monomer solution, heating multiple components of the monomer solution or any other known method of mixing the monomer solution at an elevated temperature. The time of the mixing can be any time necessary to achieve a thorough distribution of the monomers, 2-(3-(4-methyl-6-oxo-1,6-dihydropyrimidin-2-yl)ureido)ethyl methacrylate and methacrylamide, within the monomer solution. Additionally, the reaction time can be any time necessary for the reaction of monomers, 2-(3-(4-methyl-6-oxo-1,6-dihydropyrimidin-2-yl)ureido) ethyl methacrylate and methacrylamide to take place.

In one embodiment the thermoresponsive polymer is purified in a polar solvent, such as alcohol. Examples of type of polar solvents that can be used include ethanol, methanol, acetone, water, tetrahydrofuran, ether and ethyl acetate.

In one embodiment the ratio of 2-(3-(4-methyl-6-oxo-1, 6-dihydropyrimidin-2-yl)ureido)ethyl methacrylate to methacrylamide in solution A ranges in mols percentage from 0.01:99.99, 0.05:99.5, 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51, 50:50 or any range in between the numbers given.

There are a variety of methods in which the thermoresponsive polymer can be incorporated into the wastewater. In one method it is possible that the thermoresponsive polymer is directly added into the wastewater. In another method, the thermoresponsive polymer is dissolved in a chemical solution, which solubilizes the polymer, and then incorporated in the wastewater. In one example the chemical is Sodium Chloride (NaCl) solution. The amount of chemical added can be from about 0.0001 wt % to about 30 wt %, or from any amount greater than about 0.0005 wt %, 0.001 wt %, 0.005 wt %, 0.01 wt %, 0.05 wt %, 0.1 wt %, 0.5 wt %, 1 wt %, to any amount smaller than about 25 wt %, 20 wt %, 15 wt %, 10 wt %, or even about 5 wt %. Examples of wastewater can be from refineries such as desalter effluent, produced water from oil and gas production sites, from paper making facilities, from municipal water treatment facilities or any other facility that produces wastewater. Wastewater can be broadly defined as any aqueous environment that has high inorganic salts content (broadly defined as greater than or equal to 100 ppm, greater than or equal to 200 ppm or around 1000 ppm), suspended solids (≤500 ppm), hydrocarbons (as free and/or emulsified oil), other organics and inorganics or combinations thereof.

In one embodiment, the average molecular weight of the thermoresponsive polymer is greater than 50,000. In other embodiments, the average molecular weight is greater than 60,000, 62,000, 65,000, 70,000, 71,000, 75,000 even greater than 80,000.

The following examples of certain embodiments of the invention are given. Each example is provided by way of explanation of the invention, one of many embodiments of the invention, and the following examples should not be read to limit, or define, the scope of the invention.

Example 1

The amounts of 2-(3-(4-methyl-6-oxo-1,6-dihydropyrimidin-2-yl)ureido)ethyl methacrylate (MAUPy) and methacrylamide (MAAm) listed in Table 1, along with 1.2 mL of dimethyl sulfoxide solvent, were added to a 50 mL Schlenk flask equipped with a stir bar. The chemicals started to dissolve after immersing the flask in a 70° C. oil bath under strong stirring. When the solution was homogenous, the system was degassed by freeze-pump thaw using acetone-dry ice as a cold bath or by bubbling an inert gas. After degassing, the solution was again immersed into the 70° C. oil bath to preserve the monomers in solution. In a separate small vial, the corresponding amount of azobisisobutyronitrile (AIBN) was dissolved in 100 μL of dimethyl sulfoxide solvent (DMSO), and subsequently degassed. The polymerization started after the addition of the azobisisobutyronitrile solution to the reaction flask at 70° C. under an inert atmosphere or by adding a radical inhibitor. These conditions were maintained for 4 h. The polymerization was then quenched by exposing the reaction mixture to air at room temperature. Polymers were purified by 24 h of stirring in methanol (100 mL) followed by 24 h of dialysis in methanol (3000 g mol$^{-1}$ cut off).

TABLE 1

| Sample | MAAm ratio | MAUPy amount | MAAm amount | AIBN amount |
|---|---|---|---|---|
| Poly(MAUPy)-100 | 0 | 100 mg, 3.6 × 10−1 mmol | | 0.117 mg, 7.1 × 10−4 mmol |
| Poly(MAUPy-MAAm)-70 | 30 | 100 mg, 3.6 × 10−1 mmol | 13.01 mg, 0.15 mmol | 0.17 mg, 1.0 × 10−3 mmol |
| Poly(MAUPy-MAAm)-50 | 50 | 100 mg, 3.6 × 10−1 mmol | 30.37 mg, 0.36 mmol | 0.23 mg, 1.4 × 10−3 mmol |
| Poly(MAUPy-MAAm)-20 | 80 | 100 mg, 3.6 × 10−1 mmol | 121.48 mg, 1.43 mmol | 0.59 mg, 3.6 × 10−3 mmol |
| Poly(MAUPy-MAAm)-10 | 90 | 100 mg, 3.6 × 10−1 mmol | 273.32 mg, 3.24 mmol | 1.17 mg, 7.1 × 10−3 mmol |
| Poly(MAUPy-MAAm)-5 | 95 | 100 mg, 3.6 × 10−1 mmol | 577.01 mg, 6.78 mmol | 2.34 mg, 1.4 × 10−2 mmol |
| Poly(MAUPy-MAAm)-2 | 98 | 100 mg, 3.6 × 10−1 mmol | 1.49 g, 17.49 mmol | 5.86 mg, 3.6 × 10−2 mmol |

Table 2 depicts the solubility of different samples of Poly(MAUPy-MAAm)

TABLE 2

| Sample | MAAm ratio | Solubility in water 175° F. | Solubility in water at 175° F. with 1 wt % NaCl |
|---|---|---|---|
| Poly(MAUPy-MAAm)-70 | 30 | No | Yes |
| Poly(MAUPy-MAAm)-50 | 50 | No | Yes |
| Poly(MAUPy-MAAm)-20 | 80 | No | Yes |
| Poly(MAUPy-MAAm)-10 | 90 | No | Yes |
| Poly(MAUPy-MAAm)-5 | 95 | Yes | Yes |
| Poly(MAUPy-MAAm)-2 | 98 | Yes | Yes |

Example 2

Random copolymer of 5 mol % of 2-(3-(4-methyl-6-oxo-1,6-dihydropyrimidin-2-yl)ureido)ethyl methacrylate and 95 mol % of methacrylamide were synthesized in DMSO and washed in water (sample DMSO-DI). The apparent viscosity, specific viscosity and weight average molecular weight are shown in Table 3.

TABLE 3

| Polymer | Apparent Viscosity mPa-s | Specific Viscosity (a.u.) | Mw (g/mol)$^2$ |
|---|---|---|---|
| DMSO-DI | 1.074 ± 0.002 | 0.317 | 71,000 ± 1,000 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
mixing from 0.01 to about 5 mol % of 2-(3-(4-methyl-6-oxo-1,6-dihydropyrimidin-2-yl)ureido)ethyl methacrylate and from about 95 to 99.99 mol % of methacrylamide in the presence of an organic solvent to form a monomer solution;
adding an initiator to the monomer solution to form a thermoresponsive polymer,
wherein the organic solvent is selected from the group consisting of: dimethyl sulfoxide and
wherein the thermoresponsive polymer is soluble in 175° F. water,
and wherein the initiator is selected from the group consisting of: peroxides, persulfates and combinations thereof.

2. The method of claim 1, wherein monomer solution is heated to a temperature greater than 50° C.

3. The method of claim 1, wherein monomer solution is heated to a temperature greater than 70° C.

4. The method of claim 1, wherein the mixing of monomer solution occurs at an elevated temperature.

5. The method of claim 4, wherein the elevated temperature is greater than 50° C.

6. The method of claim 1, wherein the thermoresponsive polymer is purified in a polar solvent.

7. The method of claim 1, wherein the thermoresponsive polymer has weight average molecular weight greater than 50,000.

* * * * *